United States Patent
Maruyama et al.

(10) Patent No.: US 7,111,793 B2
(45) Date of Patent: Sep. 26, 2006

(54) WASHER NOZZLE AND WASHER APPARATUS

(75) Inventors: Akira Maruyama, Toyohashi (JP); Keisuke Kanazawa, Hamamatsu (JP)

(73) Assignee: ASMO Co., Ltd., Shizuoka-Pref. (JP)

( * ) Notice: Subject to any disclaimer, the term of this patent is extended or adjusted under 35 U.S.C. 154(b) by 56 days.

(21) Appl. No.: 10/478,700

(22) PCT Filed: Mar. 27, 2003

(86) PCT No.: PCT/JP03/03902

§ 371 (c)(1),
(2), (4) Date: Jan. 13, 2004

(87) PCT Pub. No.: WO03/084426

PCT Pub. Date: Oct. 16, 2003

(65) Prior Publication Data

US 2004/0251315 A1    Dec. 16, 2004

(30) Foreign Application Priority Data

Aug. 22, 2002 (JP) ............................. 2002-242519
Dec. 11, 2002 (JP) ............................. 2002-359179

(51) Int. Cl.
*B05B 1/10* (2006.01)
*B05B 1/14* (2006.01)
*B05B 1/08* (2006.01)
*B60S 1/46* (2006.01)
*A62C 31/02* (2006.01)

(52) U.S. Cl. ................ 239/284.1; 239/589; 239/589.1; 239/590.5

(58) Field of Classification Search ............. 239/284.1, 239/284.2, 589, 589.1, 597, 601, 590.5, 130, 239/131, 436, 543, 544, 545, 590, 592, 594, 239/596
See application file for complete search history.

(56) References Cited

U.S. PATENT DOCUMENTS

| 3,319,891 | A | * | 5/1967 | Campbell .................. 239/130 |
| 4,463,904 | A | | 8/1984 | Bray, Jr. |
| 4,520,961 | A | | 6/1985 | Hueber |
| 5,906,317 | A | * | 5/1999 | Srinath ................... 239/284.1 |
| 5,975,431 | A | | 11/1999 | Harita et al. |
| 6,253,782 | B1 | | 7/2001 | Raghu |
| 6,402,052 | B1 | * | 6/2002 | Murawa ................. 239/284.1 |

(Continued)

FOREIGN PATENT DOCUMENTS

JP    U-59-49564    4/1984

(Continued)

*Primary Examiner*—David A. Scherbel
*Assistant Examiner*—Darren Gorman
(74) *Attorney, Agent, or Firm*—Posz Law Group, PLC

(57) ABSTRACT

A washer nozzle includes a spread jet opening for basically jetting washer fluid in a predetermined direction of a vehicle; and a jet opening for accessorily and intensively jetting part of the washer fluid as a directional jet flow which is different from the spread flow basically jetted from the spread jet opening. The washer fluid is jetted and sprayed over a large area in a fan-shaped spread flow from the spread jet opening. Further, the washer fluid is intensively sprayed as the directional jet flow from the jet opening. Thus, sweeping performance of the washer nozzle and a washer apparatus is improved such that the directional jet flow is not substantially affected by airflow during high-speed driving so that the washer fluid is effectively utilized so as to be sprayed and supplied to areas that are prone to be left unwashed.

22 Claims, 13 Drawing Sheets

U.S. PATENT DOCUMENTS

2003/0234303 A1  12/2003  Berning et al.

FOREIGN PATENT DOCUMENTS

| JP | A-61-57452 | 3/1986 |
| JP | U-3-129557 | 12/1991 |
| JP | A-5-301564 | 11/1993 |
| JP | A-9-315270 | 12/1997 |
| JP | A-2002-67887 | 3/2002 |
| JP | A-2002-527235 | 8/2002 |
| WO | WO 00/23197 | 4/2000 |
| WO | WO 2004/000616 A1 | 12/2003 |

* cited by examiner

WASHER NOZZLE AND WASHER APPARATUS

FIELD OF THE INVENTION

The present invention relates to a washer nozzle and a washer apparatus for jetting washer fluid pumped under pressure to wash windshield glass or the like of, for example, a vehicle.

BACKGROUND OF THE INVENTION

A washer apparatus suitably used for automobile is required to wipe a large area with a small quantity of washer fluid in a short time. On this account, spread (spray)-type jet nozzles which are capable of jetting washer fluid over a large area to increase wiped areas have been proposed (e.g. Japanese Unexamined Patent Application Publication No. 2002-67887).

In this type of washer nozzle, a nozzle chip is built in a nozzle body and further the nozzle chip has an oscillation chamber for self-oscillating the pumped washer fluid. In the oscillation chamber, a channel of washer fluid fed through a feed passage in the nozzle body is formed (main channel). In addition, a plurality of feedback channel is formed therein for branching, guiding, and returning part of the washer fluid to the main channel. Thus, the washer fluid guided by the feedback channels provides a control flow, which in turn causes the washer fluid flowing through the main channel to self-oscillate. Then, the self-oscillating washer fluid is jetted in a fan-shaped spread flow over a large area.

However, if the washer fluid is spread and jetted over a large area using such a spread-type jet nozzle, the distribution of the quantity of the jetted washer fluid is not uniform. The quantity of fluid is high at both the ends of the fan-shaped spread flow and low in the center. If the washer fluid supplied onto a windshield glass is expected to spread by wiper blades, it is required to perform wiping operation more than once. Therefore, the washer fluid is not quickly spread and some areas can be remained unwashed, especially, when muddy water is sticking to the windshield glass. Further, in such a spread-type jet nozzle, the particle size of jetted washer fluid is relatively small. Therefore, the jetted washer fluid is easily affected by the airflow when the vehicle is driving at high speed, and a splashdown of the washer fluid falls down from a target point. As a result, the washer fluid is not supplied to the upper part of a windshield glass and a large unwashed area remains. Accordingly, it is difficult to secure a sufficient field of view at the driver's side.

The particle size of washer fluid is relatively small, as mentioned above. Therefore, if the spread angle of spread jet is increased so as to increase the wiped area, part of jetted fluid is flown by the airflow and sprayed out of the windshield glass. As a result, the jetted fluid is not effectively utilized.

The present invention is made with the above-mentioned problem taken into account. The object of the present invention is to provide a washer nozzle and a washer apparatus which are capable of spraying and supplying washer fluid even to areas which are likely to remain unwashed by a wiper apparatus so that wide fields of view for the driver and front-seat passenger are secured quickly and stably.

DISCLOSURE OF THE INVENTION

To attain the above-mentioned object, a washer nozzle of a first invention is characterized in that the washer nozzle comprises a spread jet opening which basically jets washer fluid in a predetermined direction of the vehicle; and a jet opening which accessorily and intensively jets part of the washer fluid as a directional jet flow which is different from a spread flow basically jetted from the spread jet opening.

With the washer nozzle of the present invention, the washer fluid can be jetted and sprayed in a fan-shaped spread flow from the spread jet opening over a large area. Also, the washer fluid can be intensively splashed down as the directional jet flow from the jet opening.

Therefore, insufficiency of the quantity of washer fluid sprayed from the spread jet opening can be complemented by intensively splashing the washer fluid as the jet flow from the jet opening. Insufficiently sprayed areas include areas where the distribution of the quantity of spread flow is sparse with respect to spray pattern; and areas which are likely to remain unwashed, for example, areas where the spread washer fluid is affected easily by airflow (i.e., the spread flow of the washings are bent so that the spread flow yields to the airflow) during high-speed driving so that splashdown area falls down to a region lower than a predetermined region. In this case, the angle of spread of spread jets is not merely increased so as to increase the wiped area. Therefore, part of jetted fluid is prevented from being blown off by airflow and sprayed out of the windshield glass, so that the jetted fluid can be effectively utilized. Thus, the wiping performance can be further enhanced.

Further, even if the splashdown of the spread flow jetted from the spread jet openings falls down due to the influence of airflow (i.e., the spread flow of the washings yields to the airflow) during high-speed driving, the upper area of the above splashdown is intensively sprayed with the jet flow jetted from the jet opening. Thus, the influence of airflow on the jet flow during driving is small., so that the washer fluid can be sprayed and supplied to the predetermined area with stability. Further, even if the splashdown of the washer fluid jetted from the jet opening, which is unsusceptible to the airflow during driving, falls down, the washer fluid can be supplied to the upper area of the splashdown. That is because the washer fluid is spread upward again by the high-speed airflow along with the inclination of the windshield glass since the washer fluid is intensively splashed down. As a result, wide sprayed regions can be secured so that the unwashed areas are reduced. Thus, the wiping performance can be further enhanced. Further, in this case, the spray pattern of spread flows from the spread jet openings (maldistribution of quantity of washer fluid) can be complemented. Thus, the wiping performance can be further enhanced.

Next, a washer nozzle of a second invention is characterized in that the washer nozzle comprises a nozzle body which has a feed passage formed therein for guiding and feeding pumped washer fluid and is fixed on a vehicle; a nozzle element which connects to the feed passage when the nozzle element is integrally assembled in the nozzle body, and has a spread jet opening formed therein for basically jetting washer fluid pumped through the feed passage as a spread flow spread in the direction of the width of the vehicle; branch channels which guide part of washer fluid fed through the feed passage; and a jet opening which connects to the branch channels and accessorily and intensively jets washer fluid from the branch channels as a directional jet flow which is different from the spread flow basically jetted from the spread jet opening.

In the washer nozzle according to the second invention, the nozzle element is integrally assembled in the nozzle body. Pumped washer fluid is jetted out of the spread jet opening formed in the nozzle element as a fan-shaped spread flow. At this time, part of the washer fluid fed to the spread jet opening through the feed passage is guided to the branch channels and jetted as a directional jet flow out of the jet opening which connects to the branch channels. These parts provide to increase the degree of freedom in designing a spray pattern.

A washer nozzle of a third invention is characterized in that the washer nozzle comprises a nozzle body which has a feed passage formed therein for guiding and feeding pumped washer fluid; a nozzle element which connects to the feed passage when the nozzle element is integrally assembled in the nozzle body, and has a spread jet opening formed therein for basically jetting washer fluid pumped through the feed passage as a spread flow spread in the direction of the width of the vehicle; and a jet opening which accessorily and intensively jets part of washer fluid fed through the feed passage as a directional jet flow which is different from the spread flow basically jetted from the spread jet opening. In this case, the basic jet is so set that the quantity of fluid spread and jetted from the spread jet opening is higher at both the ends of the angle of spread than that in the center. The accessory jet is so set that fluid from the jet opening is splashed down to the center of the basic jet.

With the washer nozzle of the third invention, the same effect as in the first and second inventions can be provided.

Further, in the washer nozzle of the second or third invention, the nozzle element may be provided with an oscillation chamber which causes the main stream of washer fluid pumped through the feed passage to self-oscillate. In this case, the washer fluid is basically jetted out of the spread jet opening as the spread flow oscillated in the direction of the width of the vehicle.

At this time, the pumped washer fluid is fed to the oscillation chamber in the nozzle element through the feed passage in the nozzle body. Further, the washer fluid self-oscillates in the oscillation chamber, and the self-oscillating washer fluid is jetted as the fan-shaped spread flow out of the spread jet opening formed in the nozzle element. By this self-oscillation, the washer fluid can be efficiently spread and jetted, so that the jetted washer fluid can be effectively utilized.

Alternatively, in the washer nozzle of the second or third invention, the shape of the spread jet opening in the nozzle element may be long, i.e., oblong in the direction of the width of the vehicle. Further, the spread jet opening may be provided with a narrowing portion in the center of the longitudinal direction, so that the width of the center in the longitudinal direction is reduced in size from the latitudinal direction at the narrowing portion. In this case, the main stream of washer fluid pumped through the feed passage is basically jetted out of the spread jet opening as the spread flow whose central portion is narrowed in the direction of spread.

Although this washer nozzle has a comparatively simple construction, the washer nozzle provides the same effect as in the first invention.

Further, in the first to third inventions, the washer fluid jetted out of the jet opening may be used as a jet for checking the coverage of spray. The coverage of spray of washer fluid is basically jetted out of the spread jet opening on the windshield glass, and checked by the splashdown of the jet on the windshield glass.

In this case, a jet for checking the coverage is jetted out of a checking jet opening formed at a predetermined angle to the spread jet opening. The coverage of spray of washer fluid jetted over a wide angle can be checked by the splashdown point of the checking jet with ease and accuracy. More specifically, the coverage of spray of washer fluid which is jetted over a wide angle is not only one splashdown point. Especially, the border of the coverage is difficult to identify and the coverage is susceptible to the wind and the like. Therefore, the coverage of spray is difficult to check (visually identify). However, it can be checked with ease and accuracy by confirming the splashdown point of the jet, which corresponds to the coverage of spray. As a result, the coverage of spray can be set (adjusted) with ease and accuracy. Furthermore, the windshield glass can be effectively washed.

The washer nozzles for vehicle of the first to third inventions are also applicable to a washer apparatus for vehicle.

With using this washer apparatus, the drawbacks of conventional spread-type jet nozzles can be removed by the washer nozzle. Further, areas which sometimes remain unwashed by a wiper apparatus can be sprayed and supplied with washer fluid. Thus, wide fields of view for the driver and front-seat passenger can be quickly and stably secured.

BRIEF DESCRIPTION OF THE DRAWINGS

In the drawings:

FIG. 7A is a schematic plan view and FIG. 7B is a schematic side view;

FIG. 8A is a schematic plan view and FIG. 8B is a schematic side view;

FIG. 15A is a bottom view illustrating the nozzle chip according to the third embodiment, FIG. 15B is a side view of the nozzle chip, and FIG. 15C is a top view of the nozzle chip;

PREFERRED EMBODIMENTS OF THE INVENTION

A washer nozzle and a washer apparatus according to the preferred embodiments of the present invention will be described below.

(First Embodiment)

Figure 1:
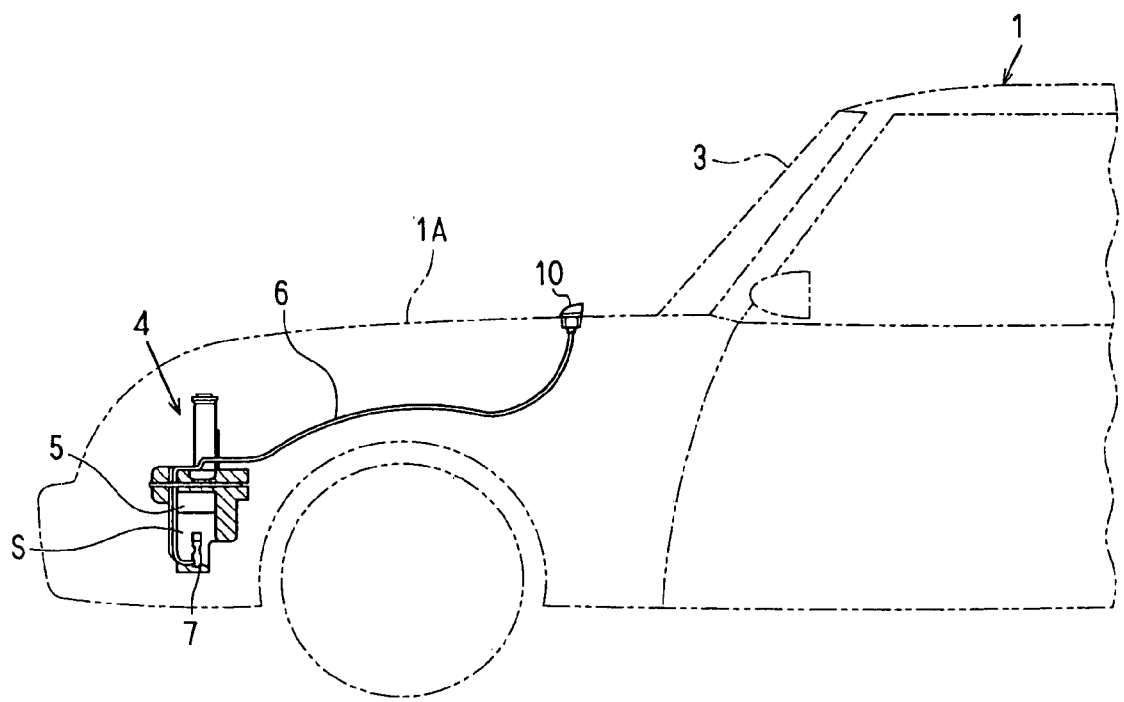
FIG. 1 is a side view illustrating a front part of an automobile.
Figure 2:
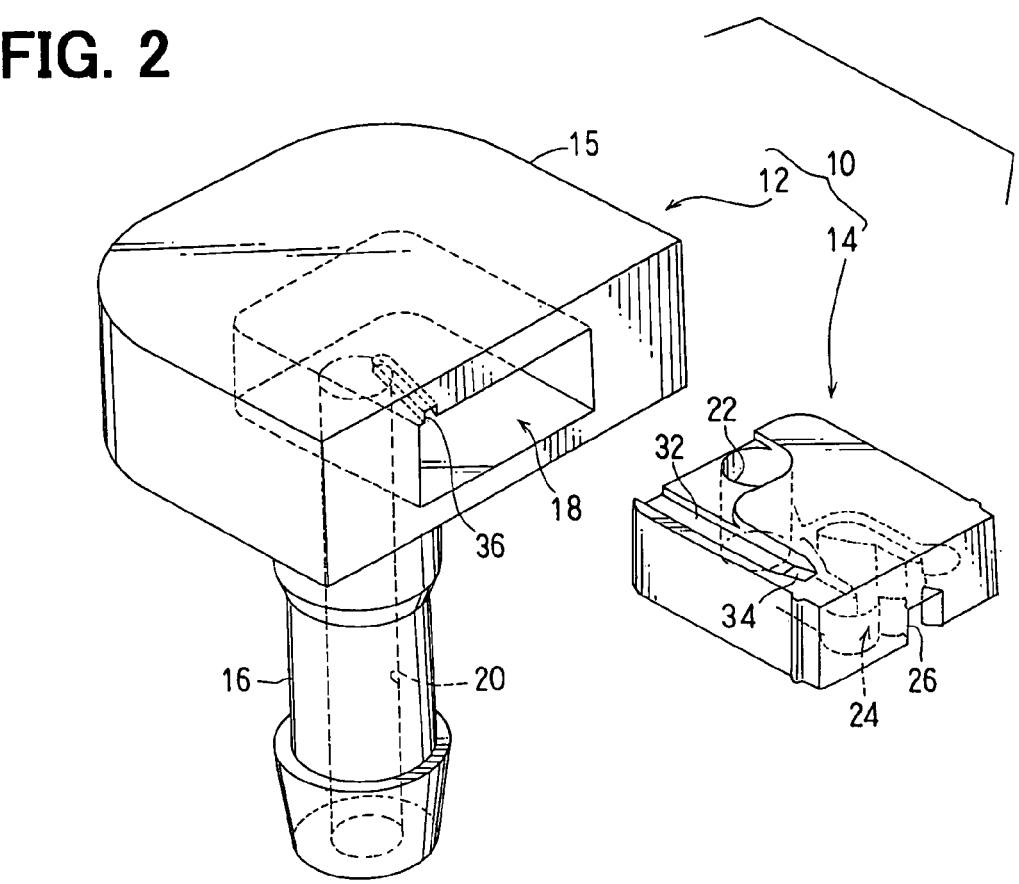
FIG. 2 is a perspective view illustrating a washer nozzle according to a first embodiment of the present invention.
Figure 3:
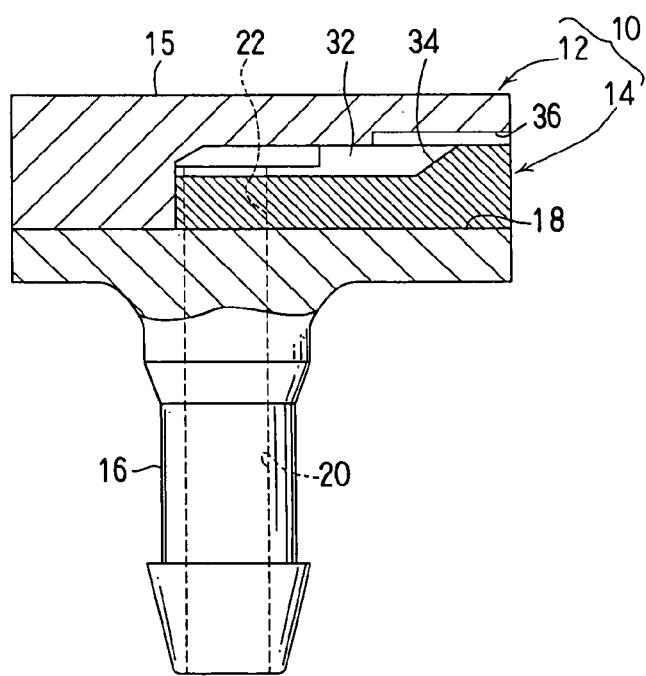
FIG. 3 is a cross-sectional view illustrating the washer nozzle according to the first embodiment.
Figure 4:
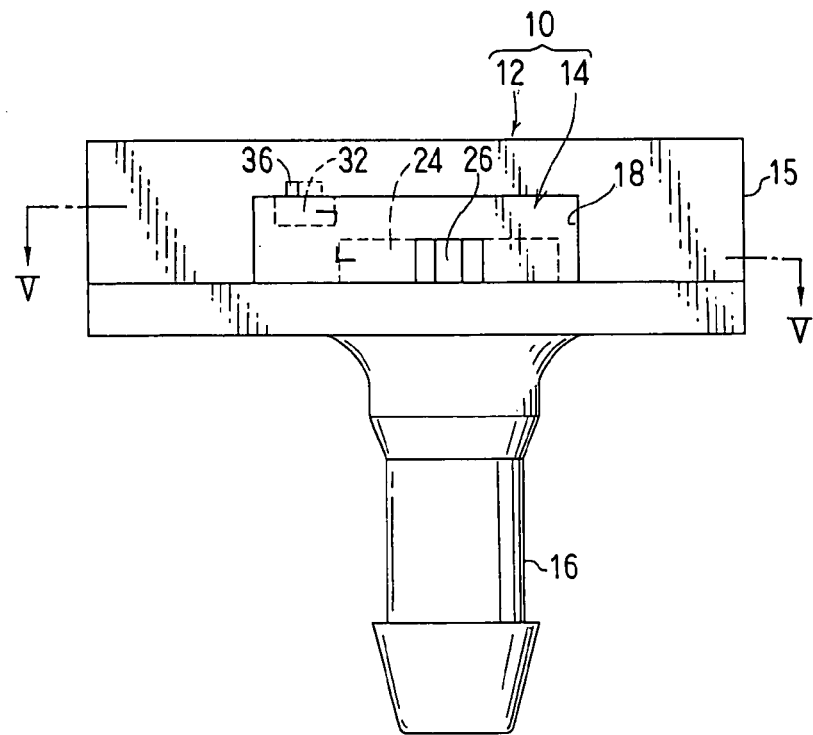
FIG. 4 is a side view illustrating the washer nozzle according to the first embodiment.

As illustrated in FIG. 1, a pair of left and right washer nozzles 10 is attached to a hood 1A of an automobile vehicle 1. (Only one washer nozzle 10 is illustrated in FIG. 1.) The washer nozzles 10 are disposed to direct to the left and right halves of a windshield glass 3, respectively. The washer nozzles 10 are parts of a washer apparatus 4 for vehicle installed at the front part of the vehicle. The washer apparatus 4 for vehicle includes a washer tank 5 for reserving washer fluid S; and a washer pump 7 for introducing the washer fluid S from the washer tank 5 to the washer nozzles 10 through a hose 6 under predetermined pressure.

As illustrated in FIGS. 2 to 5, the washer nozzle 10 has a nozzle body 12 and a nozzle chip 14.

The nozzle body 12 is made of resin, and is mounted on the hood 1A of the vehicle with a head 15 thereof exposed. A cylindrical hose coupling portion 16 is formed at the lower end of the nozzle body 12, and the hose 6 connected with the washer tank 5 reserving washer fluid S is coupled with the hose coupling portion 16.

In the nozzle body 12, a chip housing portion 18 which is open toward the front (i.e., toward the direction of the rear part of the vehicle) is formed. Further, a feed passage 20 connecting to the chip housing portion 18 is also formed in the nozzle body 12. One end of the feed passage 20 reaches the hose coupling portion 16.

The nozzle chip 14 formed by resin molding is engaged in the chip housing portion 18 integrally and liquid-tightly. The nozzle chip 14 is generally formed in box shaped, and has a channel 22 formed therein. When the nozzle chip 14 is engaged in the chip housing portion 18, the channel 22 is connected to the feed passage 20 and constructs part of the feed passage 20. On the lower side of the nozzle chip 14 (i.e., lower part of FIG. 2 or FIG. 4), an oscillation chamber 24 and a spread jet opening 26 are formed.

Figure 5:
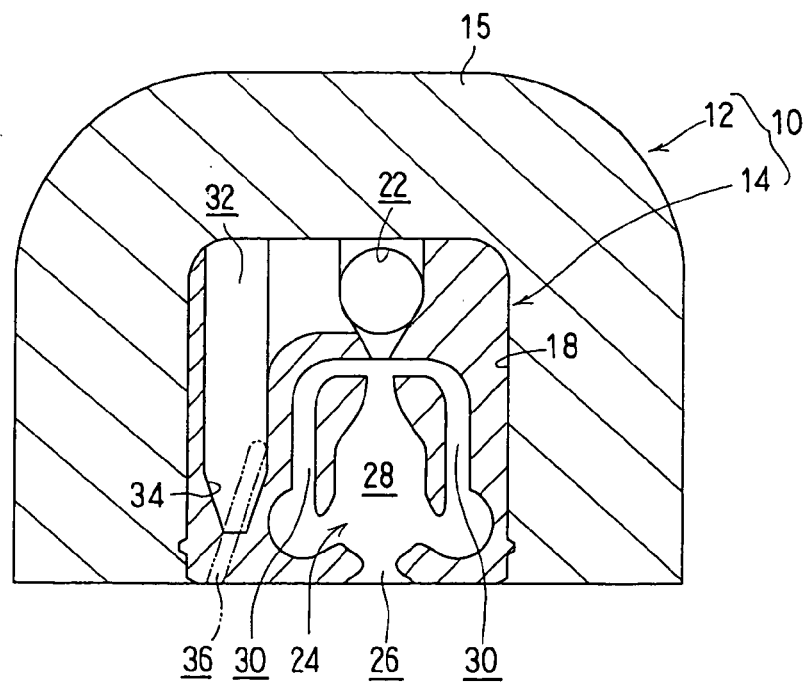
FIG. 5 is a cross-sectional view illustrating the washer nozzle taken along line V—V in FIG. 4.

As illustrated in detail in FIG. 5, the oscillation chamber 24 includes a main channel 28 which connects to the channel 22 and also connects to the spread jet opening 26; and a pair of feedback channels 30 which is branched to the left and right from the main channel 28, respectively. Thus, the oscillation chamber 24 is fed with washer fluid S through the channel 22. The feedback channels 30 are so constructed that part of washer fluid S fed through the channel 22 is branched and guided back to the main channel 28. Thus, washer fluid S guided by the feedback channels 30 forms a control flow so that the washer fluid S flowing in the main channel 28 self-oscillates. The self-oscillating washer fluid S is jetted in a fan-shaped spread flow out of the spread jet opening 26. Therefore, the washer fluid S can be jetted over a comparatively large area, and the washed area can be increased.

Further, on the upper side of the nozzle chip 14 (i.e., upper part of FIG. 2 or FIG. 4), a branch channel 32 is formed. The branch channel 32 connects to the channel 22 and is capable of independently guiding part of washer fluid S fed to the oscillation chamber 24 through the channel 22. A narrowed portion 34 having a predetermined narrowed shape is formed at the front edge of the branch channel 32.

On the top wall of the chip housing portion 18 in the nozzle body 12 for housing the nozzle chip 14 integrally and liquid-tightly, a jet opening 36 is formed. The jet opening 36 is open on the front side of the nozzle body 12, and further connects to the branch channel 32 (i.e., the narrowed portion 34) when the nozzle chip 14 is engaged in the chip housing portion 18. In other words, the jet opening 36 is located in a position displaced from the spread jet opening 26 in the direction of spreading of the spread flow from the spread jet opening 26. To describe in detail, the jet opening 36 is located in a position largely shifted in the horizontal direction and slightly shifted in the vertical direction from the spread jet opening 26. Thus, the jet opening 36 is capable of jetting washer fluid S from the branch channel 32 in a directional and independent jet flow which is different from the above-mentioned spread flow jetted out of the spread jet opening 26.

Next, the function of the first embodiment will be described.

In the washer nozzle 10 of the above construction, the washer fluid S is pumped from the washer tank 5 and fed into the hose coupling portion 16 in the nozzle body 12. Then, the washer fluid s is guided through the feed passage 20 and the channel 22 and fed into the oscillation chamber 24 in the nozzle chip 14. Furthermore, at this time, part of the washer fluid S fed through the channel 22 is branched by the feedback channels 30 and returned to the main channel 28. Thus, the washer fluid S guided through the feedback channels 30 forms a control flow and causes the washer fluid S flowing through the main channel 28 to self-oscillate. This self-oscillating washer fluid S is jetted in a fan-shaped spread flow out of the spread jet opening 26 formed in the nozzle chip 14. By this self-oscillation, the washer fluid can be spread and jetted with efficiency, and the jetted fluid can be effectively utilized.

Furthermore, at the same time, part of the washer fluid S fed into the oscillation chamber 24 through the channel 22 is guided through the branch channel 32 in the nozzle chip 14 and jetted in a jet flow out of the jet opening 36. That is, the jet flow intensively jetted from the jet opening 36 is jetted as the directional and independent jet, which is different from the spread flow jetted out of the spread jet opening 26.

As mentioned above, with the washer nozzle 10 according to the first embodiment, the washer fluid S can be not only jetted and sprayed over a larger area in a fan-shaped spread flow from the spread jet opening 26, but also intensively splash down by the directional jet flow from the jet opening 36.

Further, in this washer nozzle 10, the narrowed portion 34 having a predetermined narrowed shape is formed in the portion of the branch channel 32 connecting to the jet opening 36. Therefore, the spray pressure of the jet flow jetted out of the jet opening 36 can be favorably increased, and the jet flow can be efficiently jetted with the directionality thereof. The predetermined narrowed shape is, for example, such a shape that the channel diameter of the washer fluid S is gradually reduced so as to increase the velocity of flow of washer fluid S.

In case of this washer nozzle 10, the branch channel 32 is formed in the nozzle chip 14, and the jet opening 36 is formed in the nozzle body 12 independently of the spread jet opening 26. Further, the jet opening 36 is located in a position displaced from the spread jet opening 26 in the direction of spreading of the spread flow from the spread jet opening 26 (i.e., to the left or right side in the latitudinal direction). Therefore, the spray angle of the jet flow jetted out of the jet opening 36 can be set independently of the spread flow jetted out of the spread jet opening 26. Further, it is possible to prevent the jet flow from the jet opening 36 from being influenced by the spread flow from the spread jet opening 26 (i.e., the jet flow does not intersect with the spread flow). Alternatively, it is possible to positively intersect the jet flow and the spread flow, which are jetted independently, so as to form a mixed flow immediately before the flows splash down the windshield glass. Thus, the degree of freedom in setting a spray pattern is increased. Further, the jet opening 36 is located in a position displaced from the spread jet opening 26. Therefore, the flows of washer fluid S jetted out of the jet openings are independent each other (i.e., the spread flow from the spread jet opening 26 and the jet flow from the jet opening 36 are independent each other). Thus, they are limited from interfering each other just after being jetted. Thus, each flow of washer fluid S is prevented from being scattered and interfering with the other flow's splashing down on the predetermined point. Therefore, the wiping performance can be further increased. Further, channels, which connect the feed passage 20 and the jet openings and are otherwise complicated in shape, can be simply formed by separating the nozzle chip 14 and the nozzle body 12 from each other. Further, splashdown point and the coverage of spray of washer fluid S jetted over a wide angle can be changed by replacing only the nozzle chip 14 or changing the orientation of the nozzle chip 14. This can be done without, for example, changing the position or the direction of installation of the nozzle body 12 which is exposed to the outside of the vehicle.

Further, insufficiency of the quantity of washer fluid sprayed from the spread jet opening 26 can be complemented by intensively jetting the washer fluid as the jet flow jetted from the jet opening 36. Insufficiently sprayed areas include areas where the distribution of the quantity of spread flow is sparse with respect to spray pattern; and areas which remain unwashed, for example, areas where the jetted washer fluid is flown by the airflow (i.e., the washer fluid yields to the airflow) during high-speed driving and is splashed down to region lower than a predetermined sprayed region. Therefore, the wiping performance can be further enhanced.

Furthermore, in this washer nozzle 10, the spread jet opening 26 is formed on the underside of the nozzle chip 14, and the jet opening 36 is formed on the side of the upper face of the nozzle chip 14. Therefore, the jet flow jetted out of the jet opening 36 can be set independently of the spread flow jetted out of the spread jet opening 26 and can be further positioned above the spread flow. As in the above-mentioned function, even if a sprayed region falls down, the area above the sprayed region is intensively sprayed with the jet flow jetted from the jet opening 36. Thus, the jet flow is not substantially affected by the airflow during driving, so that the predetermined sprayed points can be sprayed and supplied with washer fluid with stability.

Figure 6:
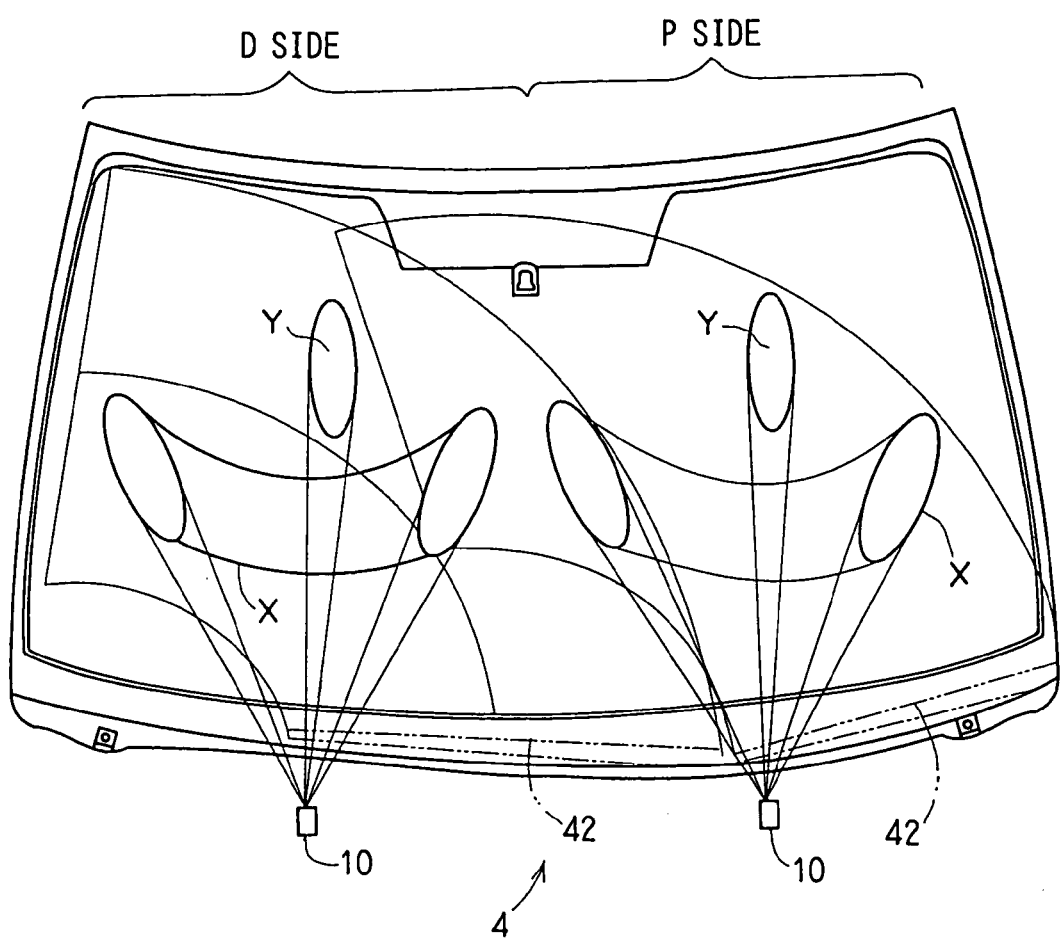
FIG. 6 is a front view illustrating areas sprayed with washer fluid in a washer apparatus having the washer nozzle according to the first embodiment.

For example, in the washer apparatus 4 illustrated in FIG. 6, this washer nozzle 10 can be applied to both the driver's side D and the front passenger side P. In this case, the spread flows jetted out of the spread jet openings 26 are taken as basic jet flows X and hit on the substantially central portions of the wiped areas of the wiper blades 42. Furthermore, the jet flows jetted out of the jet openings 36 are taken as accessory jet flows Y and hit on the areas disposed above the splashdown areas of the spread flows independently jetted out of the spread jet openings 26. Thus, even if the regions sprayed with the spread flows jetted from the spread jet openings 26 fall down due to the influences of airflow (i.e., the spread flows yield to the wind of the airflow) during high-speed driving, the areas disposed above the regions are intensively sprayed with the jet flows jetted from the jet openings 36. Thus, the influences of airflow during driving can be reduced, and intended sprayed points can be sprayed and supplied with washer fluid with stability. Further, even if the regions sprayed with the washer fluid S from the jet openings 36, which are unsusceptible to the airflow during driving, fall down, it can be compensated as a following manner. Since the washer fluid S is intensively sprayed with the jet flow, the thickness of the sprayed fluid is large, and the washer fluid S is pushed and spread upward again by the high-speed airflow along with the inclination of the windshield glass 3. As a result, wide sprayed regions can be secured, and unwashed areas are reduced. Thus, the wiping performance can be further enhanced.

Figure 7A:
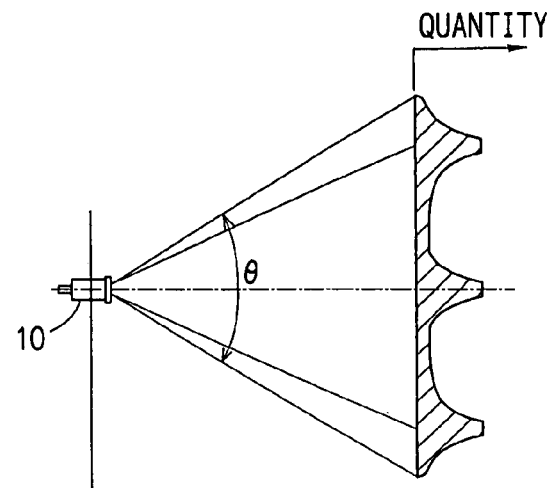
FIGS. 7A and 7B illustrate the distribution of the quantity of washer fluid jetted by the washer nozzle according to the first embodiment.
Figure 7B:
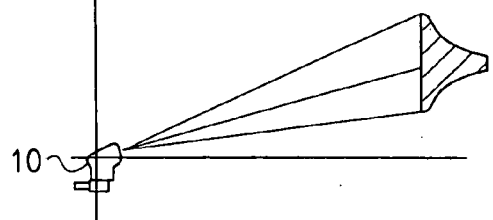
Figure 8A:
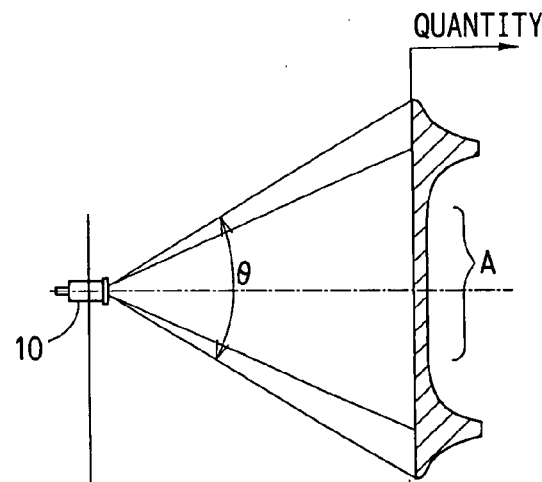
FIGS. 8A and 8B illustrate the distribution of the quantity of washer fluid jetted in a spread flow by a conventional washer nozzle.
Figure 8B:
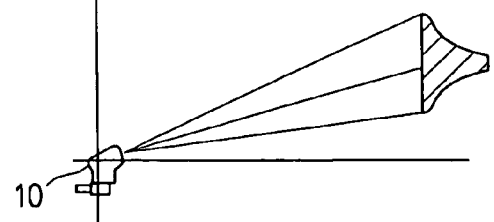

FIGS. 8A and 8B illustrate the distribution of the quantity of washer fluid jetted using a conventional washer nozzle. As illustrated in this example of prior art, there can be areas where the distribution of the quantity of fluid is sparse with respect to the spray pattern of the spread flow from the spread jet opening 26 (i.e., an area A in the center in the direction of the width of the vehicle). In this case, the jet flows jetted out of the jet openings 36 can be taken as the accessory jet flows and so set that the jet flows hit on the areas where the distribution of the quantity of spread flows jetted out of the spread jet openings 26 is sparse with respect to spray pattern. Consequently, as illustrated in FIGS. 7A and 7B, the spray pattern of spread flows from the spread jet openings 26 (that is mal-distribution of quantity of fluid) can be complemented. Thus, the wiping performance can be further enhanced. At this time, the accessory jet flows from the jet openings 36 jet toward the central portions of the spread flows from the spread jet openings 26, so that they form mixed flows.

Part of fluid jetted as the spread flows are often blown off by the airflow and sprayed out of the windshield glass 3 when the spread flows are jetted toward the upper part of the windshield glass 3. However, since the angle of spread θ of spread jets is not merely increased so as to increase the wiped area, the above constitution of the jet flows and the spread flows is prevented part of the fluid from being blown off by the airflow and sprayed out of the windshield glass 3. Consequently, the jetted fluid can be effectively utilized. Thus, the wiping performance can be further enhanced.

Figure 9:
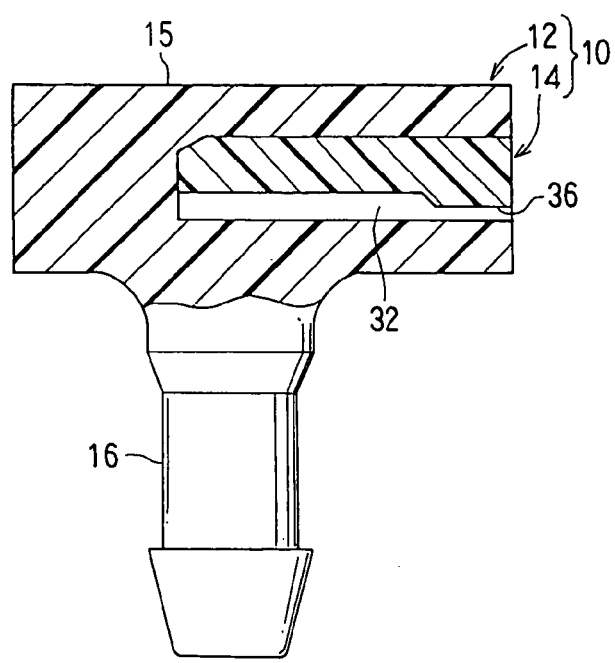
FIG. 9 is a cross-sectional view of a washer nozzle according to a modification to the first embodiment of the present invention.

In this embodiment, the branch channel 32 is formed in the nozzle chip 14, and the jet opening 36 is formed in the nozzle body 12. Alternatively, the jet opening 36 can be formed in the nozzle chip 14, together with the branch channel 32, independently of the spread jet opening 26. In this case, the shape of the nozzle body 12 is simplified, so that the molding operation for the nozzle body 12 is also simplified. Therefore, the nozzle body 12 can be manufactured at low cost. Further, in this case, the jet opening 36 is formed on the upper side of the spread jet opening 26 in the nozzle chip 14. As illustrated in FIG. 9, the jet opening 36 can be formed on the lower side of the spread jet opening 26 in such a manner that the jet opening 36 is disposed in a range of the thickness of the nozzle chip 14 in case of initial angle adjustment. That is, the jet opening 36 and the spread jet opening 26 can be formed in the nozzle chip 14 or the nozzle body 12 independently of each other. At this time, the jet and spread openings 26, 36 can be formed on the upper part or the lower part of the washer nozzle independently of each other. For example, the jet opening 36 can be formed on the upper face of the nozzle chip 14, and the spread jet opening 26 can be formed on the underside of the nozzle chip 14. Or, both the jet opening 36 and the spread jet opening 26 can be formed on the bottom face of the nozzle body 12.

Figure 10:
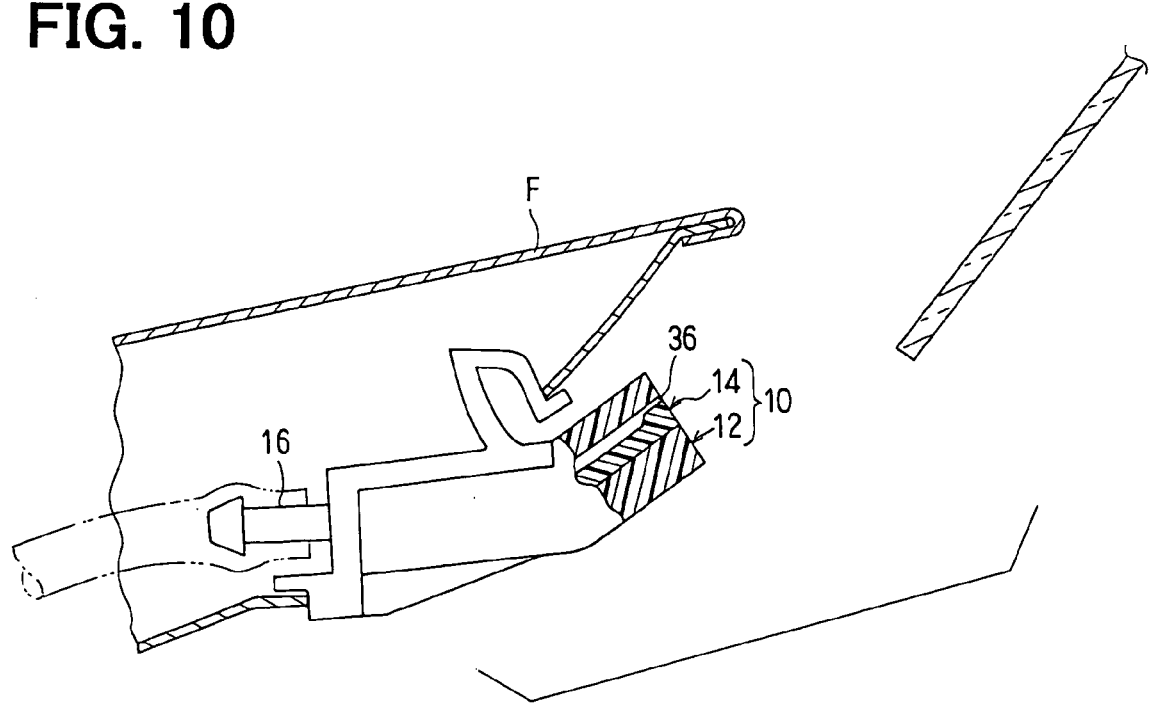
FIG. 10 is a cross-sectional view illustrating a washer nozzle according to a modification of the first embodiment.

In this embodiment, the nozzle body 12 is installed on the hood 1A of the vehicle with the head 15 thereof exposed. As illustrated in FIG. 10, the nozzle body 12 can be installed on the underside (i.e., back side) of the rear end of the engine hood F (that is, the rear end of the bonnet).

Next, other embodiments of the present invention will be described.

The substantially same components as in the above-mentioned first embodiment will be provided with the same references as in the first embodiment, and the description thereof will be omitted.

(Second Embodiment)

Figure 11:
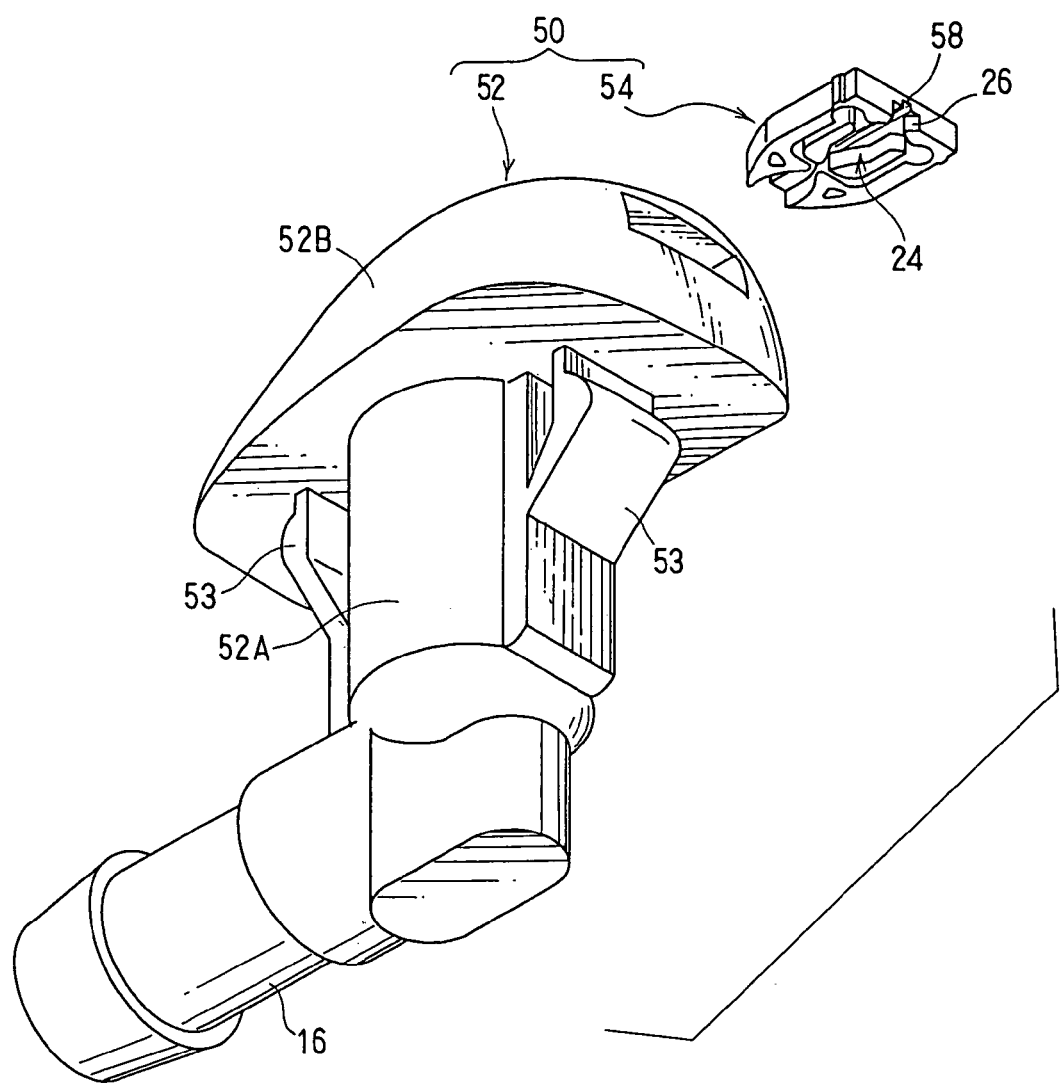
FIG. 11 is a perspective view illustrating the washer nozzle according to the second embodiment.

As illustrated in FIG. 11, the washer nozzle 50 according to the second embodiment includes a nozzle body 52 and a nozzle chip 54.

A pair of locking hooks 53, which extends toward a head 52B, are formed on the side wall of a base 52A of the nozzle body 52. The nozzle body 52 is locked on the hood of the vehicle (not shown) with the head 52B thereof exposed.

Figure 12:
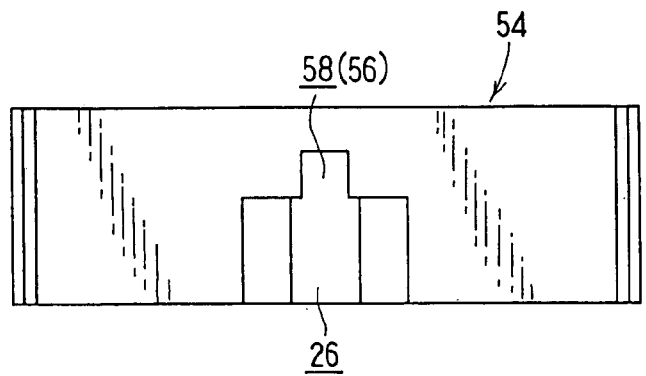
FIG. 12 is a front view of the nozzle chip of the washer nozzle according to the second embodiment.
Figure 13:
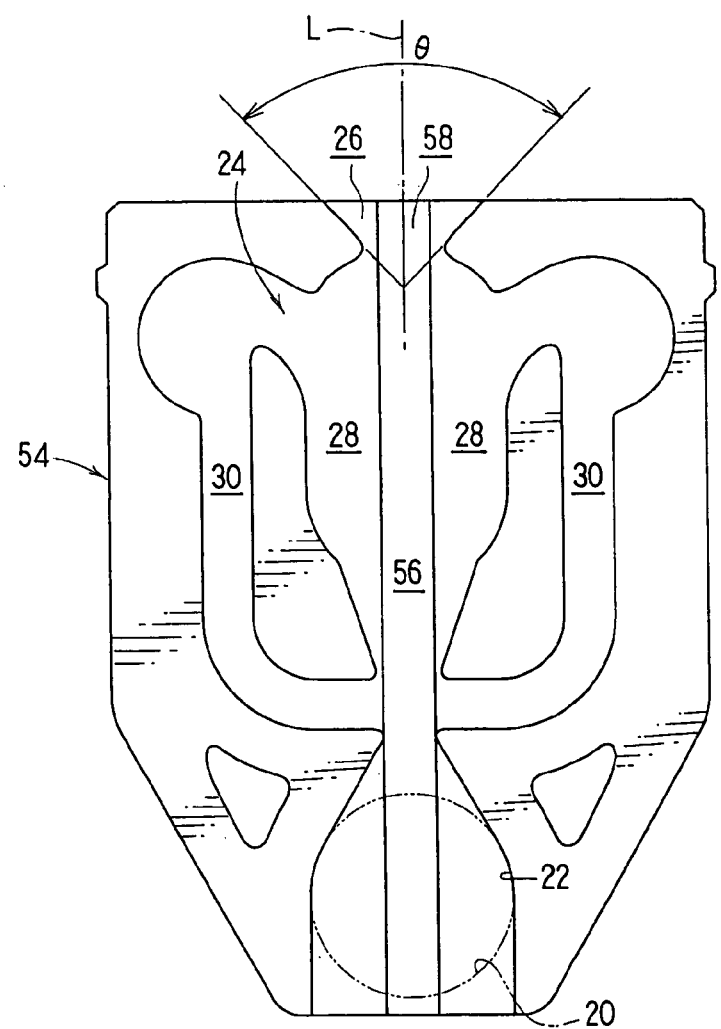
FIG. 13 is a rear view illustrating the nozzle chip of the washer nozzle according to the second embodiment.

As illustrated in FIG. 12 and FIG. 13, the nozzle chip 54 has the oscillation chamber 24 and the spread jet opening 26 formed on the underside thereof (that is disposed on the lower part of FIG. 12). This is the same as the nozzle chip 14 of the washer nozzle 10 in the first embodiment.

Further, a branch channel 56 and a jet opening 58 are formed on the underside of the nozzle chip 54. This branch channel 56 connects to the channel 22 (i.e., to the feed passage 20). Further, the branch channel 56 is formed continuously, linearly and integrally along with the main channel 28 in the oscillation chamber 24. (Also, the branch channel 56 is formed so that the top wall of the main channel 28 is partly cut off.) The jet opening 58 connects to the branch channel 56 and formed directly above the spread jet opening 26. Thus, the jet opening 58 is capable of jetting washer fluid from the branch channel 56 as the jet flow which is different from the spread flow jetted out of the above-mentioned spread jet opening 26 without passing through the oscillation chamber 24.

Next, the function of the second embodiment will be described.

In the washer nozzle 50 of the above-mentioned construction, the jet opening 58 is disposed directly on the spread jet opening 26. Therefore, the jet flow jetted out of the jet opening 58 can be mixed with the spread flow jetted out of the spread jet opening 26, and can be sprayed in a mixed flow. Thus, insufficiency of the quantity of washer fluid sprayed from the spread jet opening 26 can be complemented by intensively jetting the washer fluid as the jet flow from the jet opening 58. Insufficiently sprayed areas include areas where the distribution of the quantity of spread flow is sparse with respect to spray pattern (for example, the area A in the center in the direction of the width of the vehicle, as described above in the first embodiment). Thus, the wiping performance can be further enhanced.

Further, the branch channel 56 and the jet opening 58 are integrated with and connect to the oscillation chamber 24 in the nozzle chip 54. Therefore, the manufacturing process of the components can be simplified, and each component can be made compactly without changing other parts.

(Third Embodiment)

In the first and second embodiments, the jet flow from the jet opening 36 compensates to the insufficient fluid areas where the distribution of the quantity of fluid is sparse with respect to the spray pattern of the spread flow from, for example, the spread jet opening 26. In this embodiment, the jet flow from the jet opening 36 is not used only for the purpose of complementarily supplying washer fluid. The jet is also used to check the coverage of spray of the spread flow from the spread jet opening 26. That is, in this embodiment, the jet can be also used as a checking jet for visually checking the coverage of spray of washer fluid S from the spread jet opening 26 with ease and accuracy.

Figure 14:
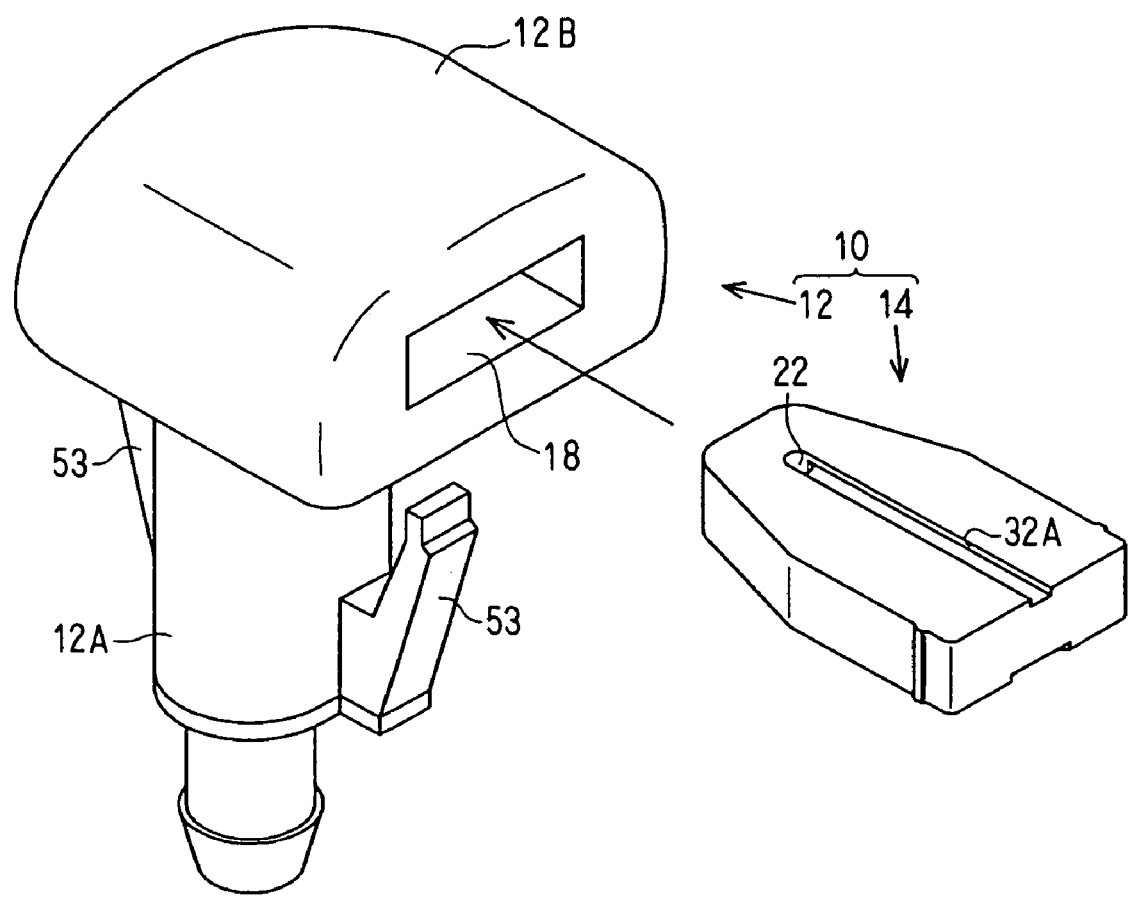
FIG. 14 is an disassembled perspective view illustrating the washer nozzle according to the third embodiment.

As illustrated in FIG. 14, the washer nozzle 10 includes the nozzle body 12 and the nozzle chip 14 as a jetting element. The nozzle body 12 has a base 12A formed in substantially cylindrical shape and a head 12B, which extends from the upper end of the base 12A in a direction substantially orthogonal to the axis thereof. In the base 12A, the feed passage 20, through which the washer fluid S is introduced, is formed. (Refer to FIG. 15B.) In the head 12B, the chip housing portion 18 connects to the feed passage 20 and is open toward the outside in a direction substantially orthogonal to the feed passage 20. On the periphery of the base 12A, a pair of locking hooks 53 is formed. The nozzle body 12 is engaged to a catching hole (not shown) formed in the hood 1A by the locking hooks 53.

Figure 15A:
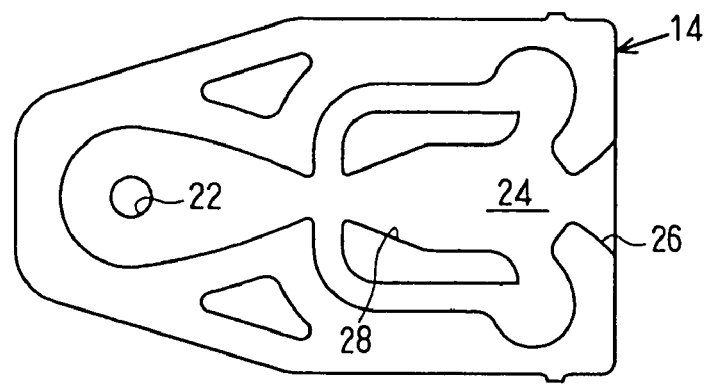
FIGS. 15A to 15C are drawings explaining the washer nozzle according to the third embodiment.
Figure 15B:
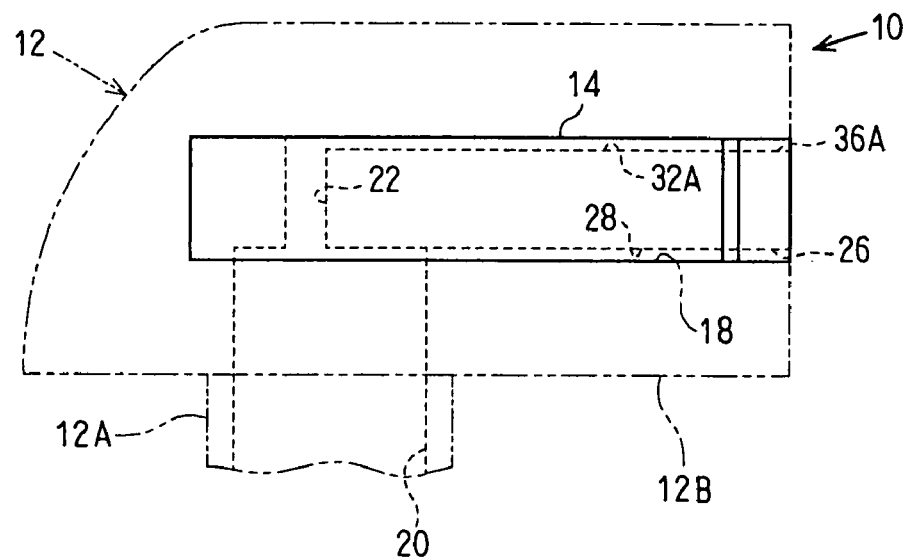
Figure 15C:
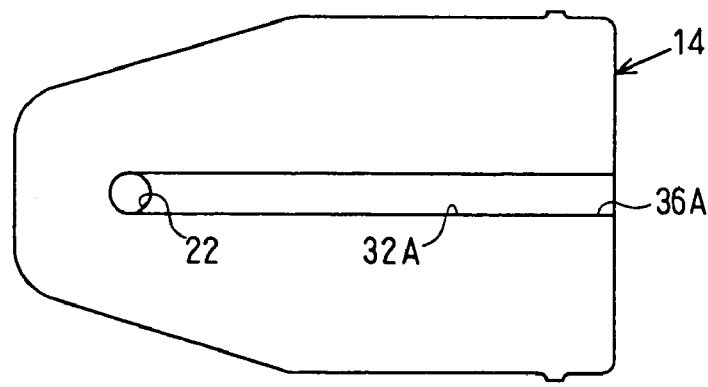

As illustrated in FIGS. 14, 15A to 15C, the nozzle chip 14 has at least two flat surfaces, and is formed in substantially rectangular shape. On one flat surface of the nozzle chip 14 (i.e., underside in FIG. 14, the main channel 28 is formed. On the other flat surface (i.e., the upper face in FIG. 14), a checking branch channel 32A is formed. Specifically, the main channel 28 is formed on the underside of the nozzle chip 14, as illustrated in FIG. 15A. The main channel 28 has the oscillation chamber 24, which is covered with a flat surface so that the washer fluid S introduced under predetermined pressure is vibrated to the left and right. The front end of the main channel 28 corresponds to the portion, which includes the oscillation chamber 24 (disposed on the right side of FIG. 15A), and is open toward the outside. As illustrated in FIGS. 15A to 15C, in the rear part of the nozzle chip 14 (disposed on the left side of FIGS. 15A to 15C), the channel 22 is formed. The channel 22 connects to the main channel 28 and further penetrates the nozzle chip 14 in the direction of thickness (i.e., in the vertical direction). As illustrated in FIG. 15C, on the upper face of the nozzle chip 14, the checking branch channel 32A, which extends from the channel 22 to the front end (disposed on a central and right side of FIG. 15C) is formed. The checking branch channel 32A is open toward the outside on the front end side (i.e., the right side of FIG. 15C). The nozzle chip 14 is assembled and engaged in the chip housing portion 18 of the nozzle body 12.

When the nozzle chip 14 is assembled in the chip housing portion 18, as mentioned above, an inner wall of the chip housing portion 18 contacts to the underside of the nozzle chip 14 liquid-tightly, so that the main channel 28 and the spread jet opening 26 are formed. This spread jet opening 26 is for jetting the washer fluid S over a wide angle in a predetermined direction. The main channel 28 connects the feed passage 20 and the spread jet opening 26, and has the oscillation chamber 24 in the intermediate portion thereof. FIG. 15A illustrates the nozzle chip 14 before being assembled in the chip housing portion 18. In this drawing, the oscillation chamber 24, the main channel 28, and the spread jet opening 26, which are formed after the nozzle chip 14 is assembled in, are also provided with reference numbers.

Further, when the nozzle chip 14 is assembled in the chip housing portion 18, another inner wall of the chip housing portion 18 contacts to the upper face of the nozzle chip 14 so that the checking branch channel 32A and the checking jet opening 36A are formed. The checking jet opening 36A is for jetting the washer fluid S as an accessory jet and linearly jetting as a jet for checking a sprayed point. The checking branch channel 32A connects the feed passage 20 and the checking jet opening 36A through the channel 22. FIG. 15C illustrates the nozzle chip 14 before being assembled in the chip housing portion 18. In this drawing, the checking branch channel 32A and the checking jet opening 36A, which are formed after the nozzle chip 14 is assembled in, are also provided with reference numbers.

The spread jet opening 26 and the checking jet opening 36A are formed so as to have a predetermined angle therebetween. For example, in this embodiment, the main channel 28 which forms part of the spread jet opening 26 and the checking branch channel 32A which forms part of the checking jet opening 36A are formed on the underside and upper face of the nozzle chip 14 which are parallel each other. In other words, the spread jet opening 26 and the checking jet opening 36A are formed in parallel with each other.

Figure 16:
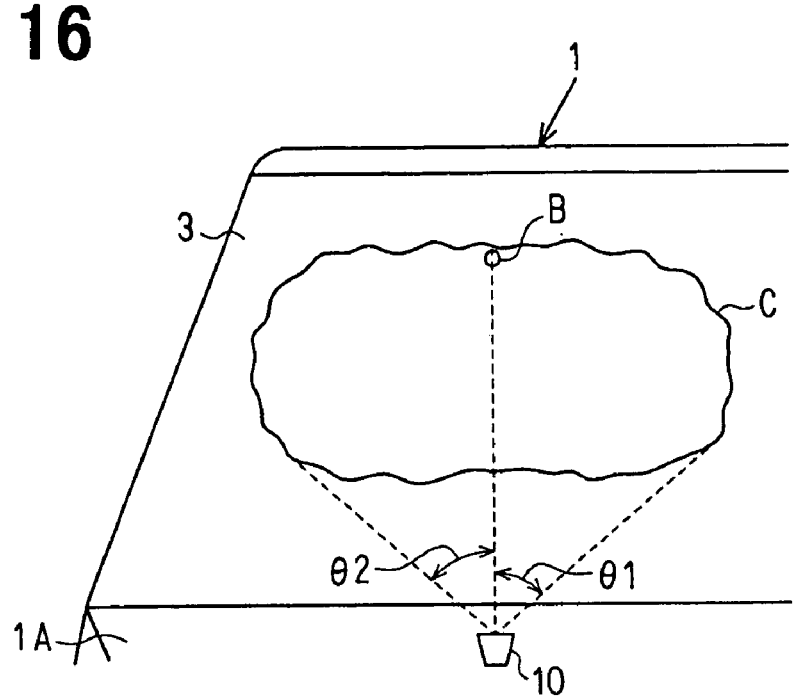
FIG. 16 is a schematic perspective view illustrating the splashdown point and coverage of spray, according to the third embodiment.
Figure 17:
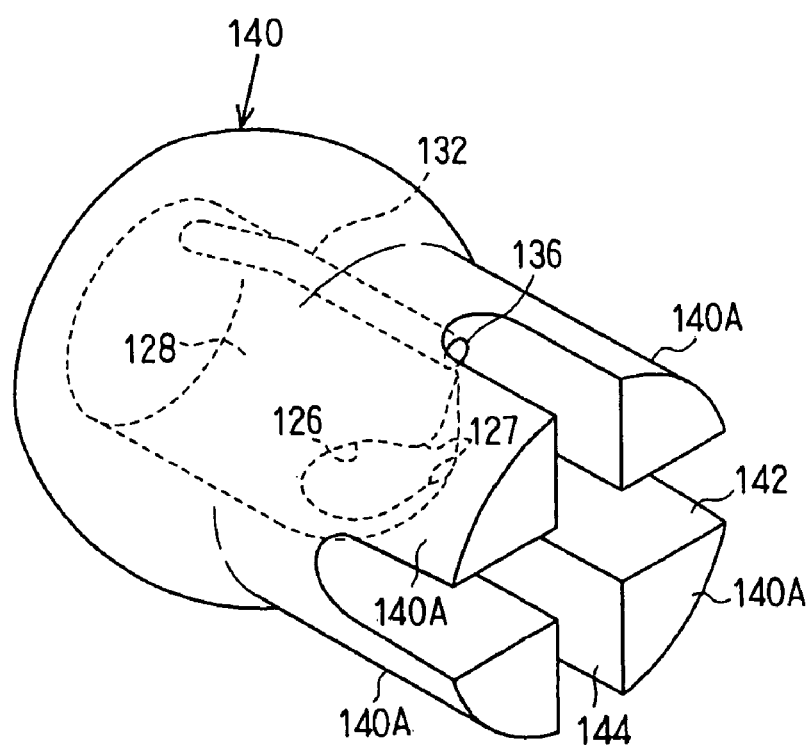
FIG. 17 is a perspective view illustrating a jetting member, according to a fourth embodiment.

The openings are so set that the washer fluid S is jetted as follows: the sprayed point B (Refer to FIG. 16) of the washer fluid S jetted as a jet from the checking jet opening 36A for checking a sprayed point is positioned in the center of the upper part of the coverage of spray C (that is an area substantially on the border of the coverage of spray C) of the washer fluid S jetted out of the spread jet opening 26 over a wide angle (the angle of spread θ1=θ2 shown in FIG. 16). Further, the checking jet opening 36A is so set that the washer fluid S jetted out thereof is visible with a small quantity, 20 which is smaller than that of the washer fluid S jetted out of the spread jet opening 26.

In the washer apparatus 4 for vehicle provided with the washer nozzle 10 constructed as mentioned above, the washer fluid S is introduced into the feed passage 20 through the hose 6 and the like 25 when the washer pump 7 is driven. Then, the washer fluid S is (vibrated to the left and right in the oscillation chamber 24 and) broken into fine particles through the main channel 28 and jetted out of the spread jet opening 26 over a wide angle in a predetermined direction. At the same time, the washer fluid S goes through the channel 22 and the checking branch channel 32A and is linearly shot from the checking jet opening 36A as a jet for checking the sprayed point (Refer to FIG. 16.). Thus, if the washer fluid S is sprayed on the windshield glass 3 over a wide angle, the spray point B of the washer fluid S can be set in an appropriate position owing to the jet for checking the coverage of spray C. Therefore, the windshield glass 3 can be favorably wiped with wiper blades (not shown). In ordinary driving, the jet for sprayed point checking can be set so that the area in the center in the direction of spreading of the basic jet, where the distribution of the quantity of fluid is sparse, is sprayed. Thus, as in the first and second embodiments, the checking jet can be used as an accessory jet of the washer fluid S, and insufficiency of the quantity of fluid jetted as a basic jet can be complemented.

Next, the function and effect of a washer apparatus provided with the washer nozzle 10 in the third embodiment will be described below.

(1) The washer fluid S is jetted out of the spread jet opening 26 over a wide angle in a predetermined direction. Further, the washer fluid S is linearly jetted as a jet for sprayed point checking out of the checking jet opening 36A. Thus, the coverage of spray C of the washer fluid S jetted over a wide angle can be checked with ease and accuracy without use of a dedicated measuring instrument or the like. This check is conducted by checking the sprayed point B of the jet for sprayed point checking from the checking jet opening 36A which is formed at a predetermined angle to the spread jet opening 26. More specifically, the coverage of spray C of washer fluid S jetted over a wide angle is not fixed at one point. Especially, the boarder of the coverage is difficult to identify and the coverage is susceptible to the wind and the like. Therefore, the coverage of spray C is difficult to check (i.e., difficult to identify visually). However, the coverage of spray C can be checked with ease and accuracy by seeing the sprayed point B of the jet for sprayed point checking, which is in predetermined relation with the coverage of spray C. As a result, the coverage of spray C can be set (adjusted) with ease and accuracy. Furthermore, the windshield glass 3 can be favorably washed.

(2) The main channel 28 is formed on the underside of the nozzle chip 14 and the checking branch channel 32A is formed on the upper face thereof. When the nozzle chip 14 is assembled in the chip housing portion 18, an inner wall of the chip housing portion 18 contacts with the underside of the nozzle chip 14 fluid-tightly, so that the main channel 28 and the spread jet opening 26 are formed. Further, when the nozzle chip 14 is assembled in the chip housing portion 18, another inner wall of the chip housing portion 18 contacts with the upper face of the nozzle chip 14 fluid-tightly, so that the checking branch channel 32A and the checking jet opening 36A are formed. With this construction, the main channel 28 and the spread jet opening 26 can be formed with ease only by forming a groove for the main channel on one face of the nozzle chip 14. (The main channel 28 connects the feed passage 20 and the spread jet opening 26 and would be otherwise complicated in shape.) Further, the checking branch channel 32A which connects the feed passage 20 and the checking jet opening 36A, and the checking jet opening 36A can be formed only by forming a groove for the checking branch channel on the other face of the nozzle chip 14. Thus, the main channel 28 (i.e., the spread jet opening 26), which is complicated in shape for jetting washer fluid S over a wide angle, can be formed with ease. That is, the main channel 28 (i.e., the spread jet opening 26) can be formed without use of any special molding tool, such as a slide mold (i.e., the main channel 28 is provided only by forming the groove). Also, the checking branch channel 32A (i.e., the checking jet opening 36A) can be formed with ease (i.e., the checking branch channel 32A is provided only by forming the groove). Further, since the nozzle body 12 and the nozzle chip 14 are separated from each other, the coverage of spray C can be changed with ease. This can be done by changing the nozzle chip 14 without changing the position or the direction of installation of the nozzle body 12 which is exposed to the outside of the hood 1A.

(3) The checking jet opening 36A is so set that the sprayed point B (Refer to FIG. 16) of washer fluid S jetted as a jet for sprayed point checking out thereof is positioned above the coverage of spray C of washer fluid S jetted out of the spread jet opening 26 over a wide angle. Thus, the driver's field of view is prevented from being instantaneously blocked by the jet for sprayed point checking when the jet hits on the windshield glass.

(4) The main channel 28 is formed on the underside of the nozzle chip 14, and the checking branch channel 32A is formed on the upper face of the nozzle chip 14. With the main channel 28 and the checking branch channel 32A formed on the faces opposite to each other, as mentioned above, the size of the nozzle chip 14 can be reduced. More specifically, the substantially rectangular-parallelepipedic nozzle chip 14 can be reduced in size, as compared with cases where the main channel 28 and the checking branch channel 32A are formed side by side on the underside or upper face. As a result, the size of the nozzle body 12, which is exposed to the outside, can be kept at the same level as in conventional cases. Thus, the appearance of the vehicle is not impaired.

With the construction of the nozzle chip in the first or second embodiment, the jet can be used in the same manner as in this embodiment. (That is, the jet can be used to check the coverage of spray.) The checking jet opening 36A can be another type of opening so that the opening 36A is not limited to that in the third embodiment.

(Fourth Embodiment)

The fourth embodiment is a modification to the washer nozzle 10 in the third embodiment. Therefore, other components (i.e., the washer tank 5, the washer pump 7, and the like) which constitute the washer apparatus for vehicle will be provided with the same references as in the third embodiment, and the detailed description thereof will be omitted. Further, in this embodiment, a different type of nozzle (i.e., a flat spray-type nozzle) is used instead of the nozzle used in the first to third embodiments. (The nozzle used in the first to third embodiments is a fluidic nozzle and is provided with an oscillation chamber for causing a fluid flow to self-oscillate.)

Figure 18:
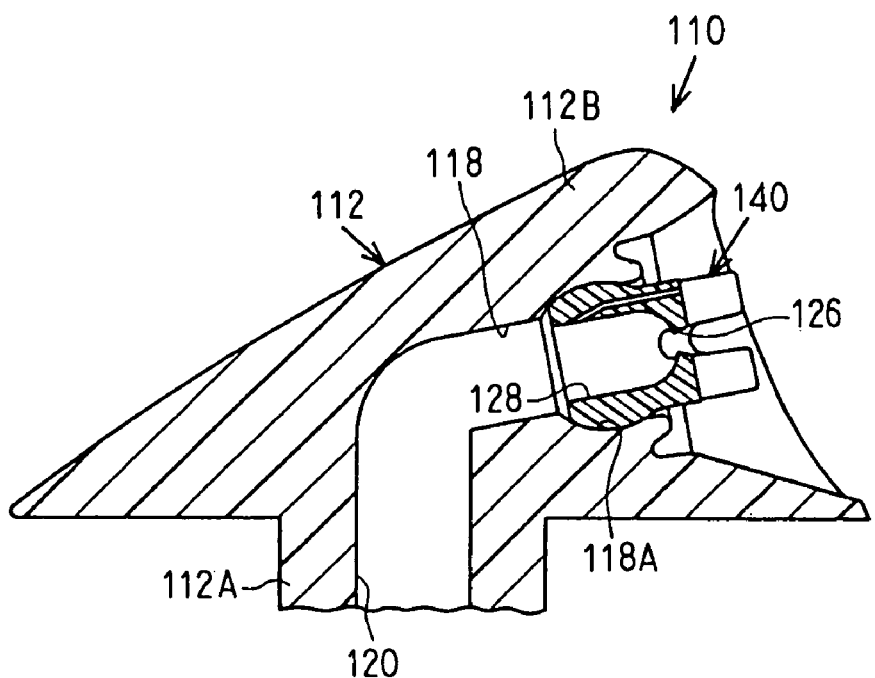
FIG. 18 is a cross-sectional view illustrating the washer nozzle according to the fourth embodiment.

As illustrated in FIG. 18, the washer nozzle 110 in this embodiment includes a nozzle body 112 and a jetting member 140 as a jetting element. The nozzle body 112 has a base 112A formed in substantially cylindrical shape and a head 112B, which extends from the upper end of the base 112A in a direction substantially orthogonal to the axis thereof. In the base 112A, a feed passage 120, through which washer fluid S is introduced, is formed. In the head 112B, a chip housing portion 118, which connects to the feed passage 120 and is open toward the outside in a direction substantially orthogonal to the feed passage 120, is formed. On the open side of the chip housing portion 118, a concavity 118A, whose inner circumferential surface is substantially spherical, is formed. The nozzle body 112 is engaged to a catching hole (not shown) formed in the hood 1A with inserting the base 112A therein.

Figure 19:
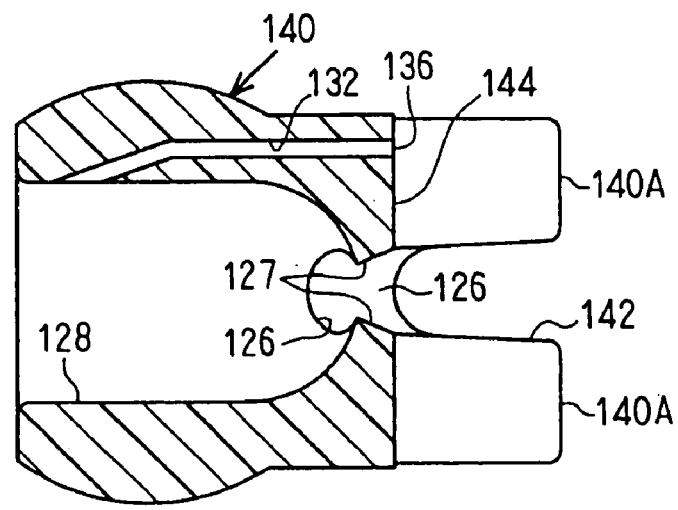
FIG. 19 is a cross-sectional view illustrating the jetting member, according to the fourth embodiment.
Figure 20:
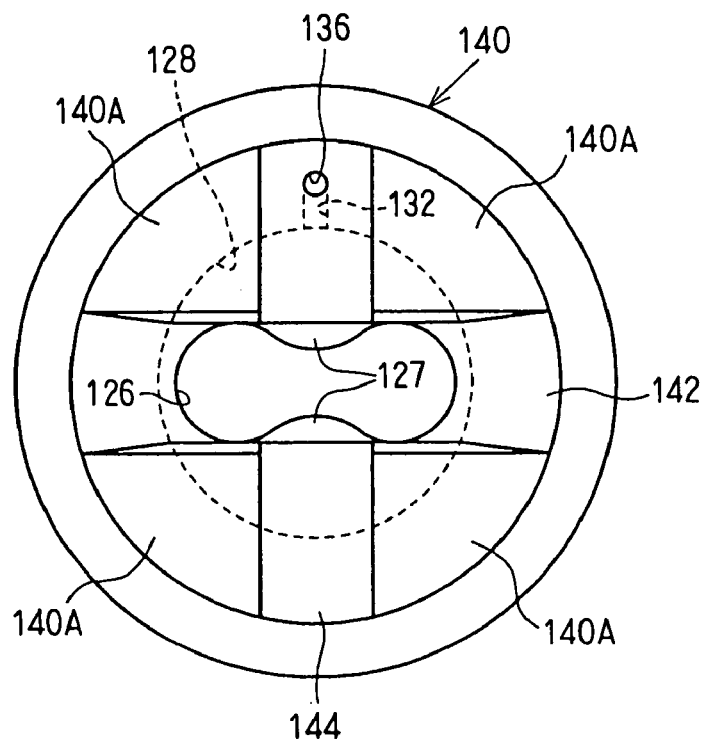
FIG. 20 is a front view illustrating the jetting member, according to the fourth embodiment.

The jetting member 140 is a flat spray-type nozzle. As illustrated in FIG. 18 to FIG. 20, the outer circumferential surface of the base of the jetting member 140 is formed in substantially spherical shape so that the base thereof can be fit in the concavity 118A. The jetting member 140 is assembled in so that the jetting member 140 is rotatable on the axis thereof with press-inserting the base of the jetting member 140 into the concavity 118A.

In the jetting member 140, a columnar main channel 128, which is open at the rear end thereof, is formed. As illustrated in FIG. 19, the main channel 128 is so constructed that the main channel 128 connects to the feed passage 120 when the jetting member 140 is press-inserted in the concavity 118A. A semi-spherical dome is formed at the front end (i.e., an outlet) of the main channel 128. The front part of the jetting member 140 has four extended portions 140A, which are extended so that they are divided by cross-shaped grooves 142, 144 cut from the front side.

Figure 21:
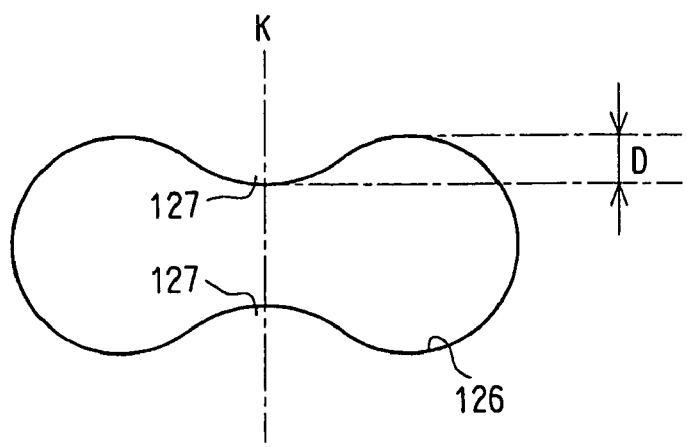
FIG. 21 is a front view illustrating a spread jet opening, according to the fourth embodiment.

On the bottom of the groove 142, a gourd-shaped spread jet opening 126 is formed so that the spread jet opening 126 connects to the main channel 128 in the domed area. The spread jet opening 126 is formed such that the longitudinal direction of the spread jet opening is matched with the extending direction of the groove 142. As illustrated in FIG. 21, the central part of the spread jet opening 126 in the longitudinal direction is narrowed by a pair of narrowing portions 127, which are protruded from both sides in the lateral direction and face each other.

As illustrated in FIG. 21, the spread jet opening 126 is in gourd shape, i.e., partly narrowed oblong shape and is symmetrical with respect to the center line K penetrating the center in the longitudinal direction. The narrowing portions 127 are protruded as if the spread jet opening 126 were divided into two equal parts by the narrowing portions 127. The narrowing portions 127 are formed with a curvature continuously varying from the curvature of the other portions of the spread jet opening 126. The amount of protrusion D of the narrowing portions 127 is equal to or more than 0.1 mm relative to the largest portion of the spread jet opening 126 in the lateral direction. The narrowing portions 127 are so designed that the spread jet opening 126 is narrowed by 0.2 mm or more in the center in the longitudinal direction. In this embodiment, the amount of protrusion D is set to 0.13 mm. The spread jet opening 126 is for jetting (spraying) washer fluid S over a wide angle in a predetermined direction, that is, in the longitudinal direction of the spread jet opening 126. The spread jet opening 126 is for shaping the coverage of spray C thereof so that the spread jet opening 126 is substantially analogously enlarged to shape the coverage of spray C.

A circular checking jet opening 136 is formed on the bottom of the groove 144 in a position located at the upper part of FIG. 20. The checking jet opening 136 is formed so that the checking jet opening 136 connects to the checking branch channel 132 branched from the main channel 128. The checking jet opening 136 is for linearly jetting washer fluid S as a jet for sprayed point checking. The cross-shaped grooves 142, 144 are for turning the jetting member 140 in the concavity 118A using a tool, such as a screwdriver. The grooves 142, 144 are provided for adjusting the orientation (i.e., the angle) of the spread jet opening 126 and the checking jet opening 136, and have no influences on the jetting of washer fluid.

The spread jet opening 126 and the checking jet opening 136 are formed at a predetermined angle to each other. For example, in this embodiment, the spread jet opening 126 and the checking jet opening 136 are formed in parallel with each other. The openings are so set that washer fluid is jetted as follows: the sprayed point B of the washer fluid S linearly jetted as a jet for sprayed point checking out of the checking jet opening 136 is positioned in the area above the coverage of spray C of the washer fluid S jetted over a wide angle out of the spread jet opening 126 whose area corresponds to the narrowing portions 127. Further, the checking jet opening 136 is so set that the washer fluid S accessorily jetted out thereof is identifiable with a smaller quantity as compared with the washer fluid S basically jetted out of the spread jet opening 126.

In a washer apparatus provided with the above-mentioned washer nozzle 110, the washer fluid S is introduced into the feed passage 120 through the hose 6 and the like when the washer pump 7 is driven. Then, the washer fluid S flows through the main channel 128 and is basically jetted (sprayed) out of the spread jet opening 126 over a wide angle in a predetermined direction. At the same time, the washer fluid S flows through the checking branch channel 132 and is accessorily and linearly jetted as a jet for sprayed point checking out of the checking jet opening 136. Thus, if the washer fluid S is sprayed on the windshield glass 3 over a wide angle, the coverage of spray C of the washer fluid S can be set in an appropriate position owing to the jet for sprayed point checking. Therefore, the windshield glass 3 can be favorably wiped with wiper blades (not shown).

Next, the function and effect of a washer apparatus provided with the washer nozzle 110 in the fourth embodiment will be described below.

(1) The washer fluid S is basically jetted out of the spread jet opening 126 over a wide angle in a predetermined direction. Further, the washer fluid S is accessorily and linearly jetted as a jet for sprayed point checking out of the checking jet opening 136. Thus, the coverage of spray C of the washer fluid S jetted over a wide angle can be checked with ease and accuracy without use of a dedicated measuring instrument or the like. This check is conducted by checking the sprayed point B of the jet for sprayed point checking from the checking jet opening 136 which is formed at a predetermined angle to the spread jet opening 126. More specifically, the coverage of spray C of washer fluid S jetted over a wide angle is not fixed at one point. Especially, the boarder of the coverage is difficult to identify and the coverage is susceptible to the wind and the like. Therefore, the coverage of spray C is difficult to check (i.e., difficult to identify visually). However, the coverage of spray C can be checked with ease and accuracy by seeing the sprayed point B of the jet for sprayed point checking, which is in predetermined relation with the coverage of spray C. As a result, the coverage of spray C can be set (adjusted) with ease and accuracy. Furthermore, the windshield glass 3 can be favorably washed.

(2) The jetting member 140 with the spread jet opening 126 and the checking jet opening 136 formed therein is rotatably assembled in the nozzle body 112. That is, the orientation (i.e., the angle) of the spread jet opening 126 and the checking jet opening 136 can be changed with a predetermined angle maintained between the spread jet opening 126 and the checking jet opening 136. Thus, the coverage of spray C of washer fluid S jetted over a wide angle can be checked and further adjusted with ease and accuracy. This check and adjustment can be conducted by seeing the sprayed point B of a jet for sprayed point checking from the checking jet opening 136 which is formed at a predetermined angle to the spread jet opening 126. Further, since the nozzle body 112 and the jetting member 140 are separated from each other, the coverage of spray C can be changed with ease. This can be done by changing the jetting member 140 without changing the position or the direction of installation of the nozzle body 112 which is exposed to the outside of the hood 1A.

(3) The checking jet opening 136 is so set that the sprayed point of washer fluid S jetted as a jet for sprayed point checking out thereof is positioned in the area above the coverage of spray C of washer fluid S jetted out of the spread jet opening 126 over a wide range whose area corresponds to the narrowing portions 127. Thus, the driver's field of view is prevented from being instantaneously blocked by the jet for sprayed point checking when the jet hits on the windshield glass.

(Modifications)

The present invention is not limited to the above-mentioned embodiments. A variety of embodiments may be implemented to the extent that the subject matter of the present invention will not be deviated from.

(1) In the third embodiment, the main channel 28 is formed on the underside of the nozzle chip 14, and the checking branch channel 32A is formed on the upper face of the nozzle chip 14. However, the main channel 28 can be formed on the upper face of the nozzle chip 14, and the checking branch channel 32A can be formed on the underside of the nozzle chip 14. Alternatively, the main channel 28 and the checking branch channel 32A can be formed on any one of the faces of the nozzle chip 14, or at least one of them can be formed on a side face of the nozzle chip 14. Alternatively, the main channel 28 can be formed on any one of the faces of the nozzle chip 14, and the relatively simple checking branch channel 32A and checking jet opening 36A can be provided by forming holes in the nozzle chip 14. In these cases, it is required to change the dimensions or the like of the nozzle chip 14 as appropriate.

(2) In the first embodiment, the branch channel 32 is formed in the nozzle chip 14, and the jet opening 36 is formed in the nozzle body 12. In the second and third embodiments, the (checking) branch channel 56 (32A) and the (checking) jet opening 58 (36A) are formed in the nozzle chip 54 (14). These openings can be formed in the nozzle chip 54 (14) or the nozzle body 12 (112) independently of each other as long as the branch channel 56 (32A) and the jet opening 58 (36A) are connected to each other. For example, both the branch channel 56 (32A) and the jet opening 58 (36A) can be formed in the nozzle body 12 (112).

(3) In the fourth embodiment, the concavity 118A, whose inner circumferential surface is substantially spherical, is formed on the open side of the chip housing portion 118. The outer circumferential surface of the base of the jetting member 140 is formed in substantially spherical shape. Then, by fitting the jetting member 140 in the concavity 118A, the jetting member 140 is assembled in so that the jetting member 140 is rotatable in the nozzle body 112. However, any other construction can be employed as long as the same function is provided. More specifically, the nozzle body 112 and the jetting member (jetting element) 140 can be constructed in any other way as long as the orientation (i.e., the angle) of the spread jet opening 126 and the checking jet opening 136 can be changed with a predetermined angle maintained between the spread jet opening 126 and the checking jet opening 136.

(4) In the third and fourth embodiments, the washer fluid S is jetted as a jet for sprayed point checking out of the checking jet opening 36A (136) and is jetted out of the spread jet opening 26 (126) over a wide angle in a certain positional relation. This positional relation between the sprayed point B of the washer fluid S from the checking jet opening 36A (136) and the coverage of spray C of the washer fluid S from the spread jet opening 26 (126) can be changed. (For example, the sprayed point B can be positioned under the coverage of spray C.)

(5) In the first to third embodiments, the washer nozzle 10 has the oscillation chamber 24 for causing a fluid flow to self-oscillate. However, the jetting member 140 used in the fourth embodiment which does not cause self-oscillation can be used in the first to third embodiments instead of the nozzle chip 14.

(6) In the first to fourth embodiments, the washer nozzle 10 (110) includes the nozzle body 12 (112) and the jetting element (i.e., the nozzle chip 14 and the jetting member 140). However, any other construction can be employed as long as the spread jet opening 26 (126) and the (checking) jet opening 36 (36A, 136) are provided. That is, the washer nozzle can be constructed of an integral molding as long as the spread jet opening 26 (126) and the (checking) jet opening 36 (36A, 136) are provided; the spread jet opening 26 (126) is for jetting washer fluid S over a wide angle in a predetermined direction, and the (checking) jet opening 36 (36A, 136) is formed at a predetermined angle to the spread jet opening 26 (126) and is for linearly jetting washer fluid S (as a jet for sprayed point checking). Or, the washer nozzle can be constructed of three or more members.

(7) In the first to fourth embodiments, the predetermined relationship between the jet opening 36 or checking jet opening 36A (136) and the spread jet opening 26 (126) is parallel. This angular relation may be changed beforehand as long as a preset angular relation is maintained.

(8) In the first to fourth embodiments, the washer nozzle 10. (110) is for spraying washer fluid S on windshield glass 3. However, the washer nozzle 10 (110) can be constructed for spraying washer fluid on any other vehicle window glass, such as rear window glass. In this case, it is required to shift the position of the washer nozzle 10 (110) in correspondence with the other vehicle window glass, such as rear window glass.

(9) In the first to fourth embodiments, the spread jet from the spread jet opening 26 (126) and the (checking) jet from the jet opening 36 or checking jet opening 36A (136) are jetted at substantially the same time. However, the spread jet and the (checking) jet can be sequentially sprayed with a time difference provided. In this case, the degree of freedom in designing a spray pattern is enhanced in terms of time. By adjusting the time difference between jet flow and spread flow, the driver's field of view can be prevented from being instantaneously blocked by the jet flow or spread flow when the flow hits on the vehicle window glass.

INDUSTRIAL APPLICABILITY

As mentioned above, with the washer nozzle and the washer apparatus of the present invention, areas which are prone to be left unwashed with a wiper apparatus can be sprayed and supplied with washer fluid. Thus, wide fields of view for the driver and the front-seat passenger can be quickly and stably ensured. Therefore, the washer nozzle and the washer apparatus can be favorably utilized as a washer nozzle and a washer apparatus which jet pumped washer fluid for washing, for example, the windshield glass of an automobile vehicle.

What is claimed is:

1. A washer nozzle for supplying washer fluid to a windshield glass of a vehicle, the washer nozzle comprising:
   a nozzle body mounted on the vehicle, wherein the nozzle body has a feed passage for introducing the washer fluid;
   a spread jet opening for basically jetting the washer fluid as a spread flow that is spread in a predetermined direction of the vehicle, the washer fluid being introduced from the feed passage; and
   a branch channel for introducing part of the washer fluid; and
   a jet opening for supplementally and intensively jetting the washer fluid as a directional jet flow, which is different from the spread flow basically jetted from the spread jet opening, the washer fluid being introduced from the branch channel, wherein the spread flow and the directional jet flow are produced simultaneously.

2. A washer nozzle for supplying washer fluid to a windshield glass of a vehicle, the washer nozzle comprising:
   a nozzle body mounted on the vehicle and having a feed passage for introducing the washer fluid;
   a nozzle element integrally assembled in the nozzle body so as to connect to the feed passage, and having a spread jet opening for basically jetting the washer fluid as a spread flow, which spreads in a lateral direction of the vehicle, the washer fluid being introduced from the feed passage;
   a branch channel for introducing part of the washer fluid fed from the feed passage; and
   a jet opening connecting to the branch channel for supplementally and intensively jetting the washer fluid as a directional jet flow, which is different from the spread flow basically jetted from the spread jet opening, the washer fluid being introduced from the branch channel, wherein the spread flow and the directional jet flow are produced simultaneously.

3. The washer nozzle according to claim 2,
   wherein the nozzle element includes an oscillation chamber for self-oscillating a mainstream of the washer fluid introduced from the feed passage, and
   wherein the spread jet opening basically jets the washer fluid as a spread flow oscillated in the lateral direction of the vehicle.

4. The washer nozzle according to claim 2,
   wherein the spread jet opening has an oblong shape extending in the lateral direction of the vehicle, and has a narrowing portion for narrowing a center of the spread jet opening in the lateral direction, and
   wherein the spread jet opening basically jets the washer fluid as the spread flow, a center of which in a spreading direction is narrowed, the washer fluid being introduced from the feed passage.

5. The washer nozzle according to claim 2,
   wherein the spread flow jetted from the spread jet opening has a spread spray angle, and
   wherein the directional jet flow jetted from the jet opening has a jet spray angle, which has a predetermined relationship to the spread spray angle.

6. The washer nozzle according to claim 2, wherein the jet opening is displaced from the spread jet opening.

7. The washer nozzle according to claim 6,
   wherein the branch channel is disposed in the nozzle element, and
   wherein the jet opening is disposed in the nozzle body or the nozzle element, and is independent of the spread jet opening.

8. The washer nozzle according to claim 2,
   wherein the nozzle element includes two opposite flat faces, and
   wherein the spread jet opening is disposed on one flat face of the nozzle element, and the jet opening is disposed on the other flat face of the nozzle element.

9. The washer nozzle according to claim 2, wherein the branch channel has a narrowed portion with a predetermined shape for connecting to the jet opening.

10. A washer nozzle for supplying washer fluid to a windshield glass of a vehicle, the washer nozzle comprising:

a nozzle body mounted on the vehicle and having a feed passage for introducing the washer fluid;

a nozzle element integrally assembled in the nozzle body so as to connect to the feed passage, and having a spread jet opening for basically jetting the washer fluid as a spread flow, which spreads in a lateral direction of the vehicle, the washer fluid being introduced from the feed passage; and a jet opening for supplementally and intensively jetting part of the washer fluid as a directional jet flow, which is different from the spread flow, the washer fluid being introduced from the feed passage, wherein the spread flow has a distribution of quantity of the washer fluid such that the quantity of the washer fluid at both ends of the spread flow jetted from the spread jet opening is larger than that in a center of the spread flow, and wherein the jet flow is jetted from the jet opening toward the center of the spread flow.

11. The washer nozzle according to claim 10, wherein the nozzle element includes an oscillation chamber for self-oscillating a mainstream of the washer fluid introduced from the feed passage, and wherein the spread jet opening basically jets the washer fluid as a spread flow oscillated in the lateral direction of the vehicle.

12. The washer nozzle according to claim 10, wherein the spread jet opening has an oblong shape extending in a lateral direction of the vehicle, and has a narrowing portion for narrowing a center of the spread jet opening in a vertical direction, and wherein the spread jet opening basically jets the washer fluid as a spread flow, a center of which is narrowed in a spreading direction, the washer fluid being introduced from the feed passage.

13. A washer apparatus suitably used for a vehicle comprising the washer nozzle according to claim 2.

14. A washer nozzle for supplying washer fluid to a windshield glass of a vehicle, the washer nozzle comprising:

a nozzle body mounted on the vehicle and having a feed passage for introducing the washer fluid;

a nozzle element integrally assembled in the nozzle body so as to connect to the feed passage, and having a spread jet opening for basically jetting the washer fluid as a spread flow, which spreads in a lateral direction of the vehicle, the washer fluid being introduced from the feed passage;

a branch channel for introducing part of the washer fluid fed from the feed passage; and a jet opening connecting to the branch channel for supplementally and intensively jetting the washer fluid as a directional jet flow, which is different from the spread flow basically jetted from the spread jet opening, the washer fluid being introduced from the branch channel, wherein the nozzle element includes two opposite flat faces, and the spread jet opening is located on one flat face of the nozzle element, and the jet opening is located on the other flat face of the nozzle element.

15. The washer nozzle according to claim 14, wherein the nozzle element includes an oscillation chamber for self-oscillating a mainstream of the washer fluid introduced from the feed passage, and the spread jet opening basically jets the washer fluid as a spread flow oscillated in the lateral direction of the vehicle.

16. The washer nozzle according to claim 14, wherein the spread flow jetted from the spread jet opening has a spread spray angle, and the directional jet flow jetted from the jet opening has a jet spray angle, which has a predetermined relationship to the spread spray angle.

17. The washer nozzle according to claim 14, wherein the jet opening is displaced from the spread jet opening.

18. The washer nozzle according to claim 17, wherein the branch channel is disposed in the nozzle element, and the jet opening is disposed in the nozzle body or the nozzle element, and is independent of the spread jet opening.

19. The washer nozzle according to claim 14, wherein the branch channel has a narrowed portion with a predetermined shape for connecting to the jet opening.

20. A washer apparatus suitably used for a vehicle comprising the washer nozzle according to claim 14.

21. The washer nozzle according to claim 1, wherein the spread flow has a pattern that is relatively wide in the lateral direction of the windshield, and the directional flow is a fixed stream that has a relatively narrow pattern in the lateral direction of the windshield compared to the spread flow.

22. The washer nozzle according to claim 2, wherein the spread flow has a pattern that is relatively wide in the lateral direction of the windshield, and the directional flow is a fixed stream that has a relatively narrow pattern in the lateral direction of the windshield compared to the spread flow.

* * * * *